US 8,989,923 B2

(12) United States Patent
De Prins et al.

(10) Patent No.: US 8,989,923 B2
(45) Date of Patent: Mar. 24, 2015

(54) NAVIGATION PERFORMANCE SPECIFICATION

(71) Applicant: The Boeing Company, Chicago, IL (US)

(72) Inventors: Johan L. De Prins, Heverlee (BE); Ramon Gomez, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/091,042

(22) Filed: Nov. 26, 2013

(65) Prior Publication Data

US 2014/0148979 A1    May 29, 2014

(30) Foreign Application Priority Data

Nov. 29, 2012   (EP) .................................. 12382474

(51) Int. Cl.
*G06F 17/00* (2006.01)
*G01C 23/00* (2006.01)
*G05D 1/10* (2006.01)
(Continued)

(52) U.S. Cl.
CPC .............. *G01C 23/00* (2013.01); *G01C 23/005* (2013.01); *G05D 1/101* (2013.01); *G08G 5/0052* (2013.01); *G08G 5/025* (2013.01)
USPC .................. 701/3; 701/14; 701/16; 701/442; 701/466; 701/528; 244/194

(58) Field of Classification Search
CPC .... G01C 21/165; G01C 23/00; G08G 5/0052; G03F 1/26; G03F 1/84
USPC ................ 701/3, 14, 16, 414, 442, 466, 528; 244/194
See application file for complete search history.

(56) References Cited

U.S. PATENT DOCUMENTS 2,468,045 A * 4/1949 Deloraine ..................... 340/990
6,643,580 B1 * 11/2003 Naimer et al. ................ 701/467
(Continued)

FOREIGN PATENT DOCUMENTS

GB      2472497 A      2/2011

OTHER PUBLICATIONS

Bailin et al., Prototype Flight Management Capabilities to Explore Temporal RNP Concepts, 2008, IEEE, p. 3.A.6-1 to 3.A.6-12.*
(Continued)

*Primary Examiner* — McDieunel Marc
(74) *Attorney, Agent, or Firm* — Hanley, Flight & Zimmerman, LLC

(57) ABSTRACT

A method of formulating a specification for temporal and vertical required navigation performance is described. The method assesses various flight management guidance systems methods and allows a specification to be set for an airport. The specification may be used to increase aircraft traffic into the airport. The specification sets limits on deviations in time and altitude, for example, on approach into arrivals at the airport. The method comprises: calculating temporal and vertical deviations from a reference trajectory for one or more flight management guidance methods for one or more aircraft types; and comparing the temporal and vertical deviations with operational requirements of the airport. The deviations from a reference trajectory may result from uncertainties affecting trajectory prediction, such as wind and temperature prediction accuracy.

20 Claims, 5 Drawing Sheets

(51) Int. Cl.
*G08G 5/00* (2006.01)
*G08G 5/02* (2006.01)

(56) References Cited

U.S. PATENT DOCUMENTS

| | | | |
|---|---|---|---|
| 6,816,780 B2* | 11/2004 | Naimer et al. | 701/467 |
| 6,885,313 B2* | 4/2005 | Selk et al. | 340/945 |
| 2008/0125962 A1* | 5/2008 | Wipplinger et al. | 701/201 |
| 2009/0112464 A1* | 4/2009 | Belcher | 701/210 |
| 2009/0112539 A1* | 4/2009 | Halvorson et al. | 703/8 |
| 2010/0052949 A1* | 3/2010 | Suddreth et al. | 340/995.19 |
| 2012/0120238 A1* | 5/2012 | Adar et al. | 348/143 |
| 2013/0085661 A1* | 4/2013 | Chan et al. | 701/122 |
| 2013/0138395 A1* | 5/2013 | Baggen et al. | 702/181 |

OTHER PUBLICATIONS

Diaz-Mercado et al., Optimal Trajectory Generation for Next Generation Flight Management Systems, 2013, IEEE, pg.*

European Patent Office, "Extended European Search Report," issued in connection with Application No. 12382474.0, May 17, 2013, 6 pages.

Klein et al., "An Analysis of Automation for Monitoring Area Navigation (RNAV) and Required Navigation Performance (RNP) Terminal Operations," 2008, 12 pages, The MITRE Corporation's Center for Advanced Aviation System Development, McLean, Virginia.

"Aero 12—Required Navigation Performance," retrieved from the internet on Feb. 5, 2013, http://www.boeing.com/commerical.aeromagazine/aero_12/, 12 pages, The Boeing Company.

* cited by examiner

NAVIGATION PERFORMANCE SPECIFICATION

FIELD

The present disclosure relates to flight management system guidance methods and, in particular, to comparing the navigation performance of the guidance methods.

BACKGROUND

Flight paths are generally calculated in three dimensions, i.e. altitude and lateral position. To calculate a flight path in four dimensions requires the three-dimensional position of the aircraft to be specified over a number of points in time.

The ability to fly an aircraft according to a predetermined flight path with accuracy such that its position as a function of time is predictable is becoming increasingly important in air traffic control. This would allow air traffic control to relax separations between aircraft, leading to more efficient use of air space.

Typically, aircraft approach an airport under the guidance of air traffic controllers. The air traffic controllers are tasked with ensuring the safe arrival of aircraft at their destination, while also ensuring the capacity of the airport is maximised. The former requirement is generally met by ensuring minimum specified separations are maintained between aircraft. Air traffic control is subject to uncertainties that may act to erode the separation between aircraft such as variable winds, both in speed and direction, and different piloting practices. Nonetheless, large numbers of aircraft can operate safely confined in a relatively small space since air traffic control can correct for these uncertainties at a tactical level using radar vectoring, velocity change and/or altitude change. A typical approach to an airport will involve a stepped approach where the aircraft is cleared to descend in steps to successively lower altitudes as other air traffic allows.

Most commercial aircraft are equipped with flight management systems which offer automated navigation in descent. For example, FIG. 1 shows how such a system might operate. At step 101 the flight management system plans a reference trajectory for the descent into an airport. The reference trajectory will be in accordance with air traffic management requirements and rules set by the flight management system. The aircraft is automatically directed along the trajectory. The system monitors for real-time deviations from the reference trajectory at step 102. The flight management guidance system corrects for deviations at step 103, by adjusting one or more flight parameters at the expense of others. For example, position may be maintained at the expense of timing, or vice versa.

One particular example of a flight management system is an automated vertical navigation (VNAV) system with different modes, such as VNAV PATH which is typically used in descent. VNAV PATH uses a path-on-elevator method to track a vertical reference profile. In this mode the aircraft tracks a reference potential energy profile, while the engines remain at a reference idle power. Unexpected energy deviations, such as caused by errors in the predicted wind strength and/or direction, will affect the kinetic energy. That is, the ground speed of the aircraft maybe changed because of the wind strength, which in turn results in changes to the aircraft position over time.

A different mode of operation of a flight management system is VNAV SPEED which is controlled by comparing how the airspeed at the elevator tracks an airspeed reference profile. In this mode unexpected energy deviations primarily result in potential energy deviations along with some kinetic energy deviation arising because of the relationship between airspeed and ground speed.

A more advanced guidance method used by Boeing 737s is a Required Time of Arrival (RTA) method which combines VNAV PATH with path recalculations to meet a target time of arrival at a given waypoint.

Furthermore, under current research is a four-dimensional guidance method in which the aircraft tracks a ground speed reference. In the method all errors are pushed into the vertical position of the aircraft using the elevators.

Other four dimensional guidance methods have been developed which apply energy corrections to the aircraft using spoilers and throttles respectively to decrease and increase kinetic energy. Further four dimensional guidance methods attempt to meet a target arrival time which apply energy corrections by deploying high-lifting devices (flaps) and landing gear earlier or later in the descent.

Ultimately the various different guidance methods, principals and systems each have some combination of vertical and temporal deviation from a reference trajectory. Statistics on these vertical and temporal deviations will result in predicted vertical and temporal actual navigation performance, known as V-ANP and T-ANP. By also considering external factors which have various inaccuracies, for example in predicted wind speed, or aircraft mass, further deviations will arise.

In future Super-Density Operations as part of the next generation of air traffic management it is expected that four-dimensional trajectories will be contracted between the air and ground. Limitations to any deviations to the trajectories must be set to avoid conflicts in the airspace, especially when aircraft are merging, are in-trail, or when crossing traffic. An aim of the next generation of air traffic management standards is also to be able to accommodate an increased throughput of aircraft to cope with a growth in traffic. This might be achieved by setting more stringent specifications on aircraft arrival time. Hence, the air navigation service provider (ANSP) will need to set a specification for the required temporal and vertical navigation performance (T-RNP and V-RNP) similar to current specifications set for lateral required navigation performance. In the US the Federal Aviation Authority has requested information from the aircraft and air traffic management industry so that it can ascertain and ultimately set reasonable navigation requirements without excessively constraining airport operations. Hence, there is a need for a technique for considering and assessing suitable vertical and temporal navigation performance (V-RNP and T-RNP) requirements.

The definition of appropriate values for vertical and temporal navigation performance (V-RNP and T-RNP) is not straight forward because they cannot be set independently of each other. As described above, energy conservation principles provide links between them. That is, the time of arrival at a particular waypoint can be brought forward by speeding up the aircraft, for example by pointing the nose down to lose height and increase the aircraft velocity. Furthermore, certain combinations may not be viable and will be dependent on the type and equipment levels of the aircraft.

Another factor to be taken into account is the operational requirements of a given airport. For example, a low traffic airport in a city or metro environment may need to set more stringent V-RNP at the expense of relaxed T-RNP, whereas a heavy traffic airport may set a tight T-RNP during peak time hours. In particular, the T-RNP may limit the aircraft types that can meet the navigation requirements during that time.

But such a T-RNP would need to be relaxed at other times because otherwise the types of aircraft entering that airport would be restricted.

Currently, vertical navigation performance is only evaluated in terms of the accuracy of the flight guidance such as controlled by, for example, a path-on-elevator method. In other words the vertical performance is assessed by how accurately the aircraft tracks the vertical part of the reference trajectory in the presence of flight technical errors and navigation system errors. Research on temporal navigation performance has focussed on delivery/timing accuracy at specific waypoints, such as the runway threshold or meter fixes. The evaluation of both vertical and temporal accuracy of vertical guidance methods with respect to a descent profile between the air and ground adds new complexity.

As mentioned above the V-RNP and T-RNP are linked to each other to such an extent that the specification of limits for one impacts the other. In order to aid the air navigation service providers (ANSPs) in setting limits on V-RNP and T-RNP it would be useful to be able to see their relationship and how the various flight management systems and control modes affect the relationship.

SUMMARY

The present disclosure provides a method of formulating a specification for temporal and vertical required navigation performance, T-RNP and V-RNP, that is, setting limits on deviations in time and altitude, for example on approach into arrivals at an airport. V-RNP is also known as VNAV (vertical navigation) performance or VNAV confinement. The method comprises: calculating temporal and vertical deviations from a reference trajectory for one or more flight management guidance methods for one or more aircraft types; and comparing the temporal and vertical deviations with operational requirements of an airport. For example, the comparison may be performed to compare different aircraft types running different flight management guidance methods. The comparison may instead or additionally consider different aircraft types running the same flight management guidance methods. The different aircraft types may have different characteristics and therefore result in different performance variations. Furthermore, the same aircraft type may be run with different flight management guidance methods.

The method may further comprise generating the specification for temporal and vertical required navigation performance based on the step of comparing. The method may also take into account the available guidance methods meeting at least one of the temporal and vertical required navigation performances.

In an alternative but related example, the comparison may be to a benchmark or reference specification instead of to operational requirements of an airport. The benchmark or reference specification may be used, for example, during guidance method development.

The step of comparing may comprise: generating a map of said temporal and vertical deviations from the reference trajectory for each of said one or more flight management guidance methods for the one or more aircraft types; and assessing the map for each of said one or more flight management methods for the one or more aircraft types in comparison to the operational requirements or reference to generate the specification. The map may comprise a diagram, chart or graph plotting time and altitude deviations for each flight management guidance method and/or aircraft type.

The step of calculating temporal and vertical deviations from a reference trajectory may comprise calculating temporal and vertical actual navigation performance for the one or more flight management guidance methods of the one or more aircraft types. Temporal and vertical actual navigation performance may be the simulated performance using a given flight management system guidance method and input parameters such as specific to an aircraft type, airport, and loading. On the other hand, the required navigation performance sets the target performance or specification.

The step of calculating temporal and vertical actual navigation performance includes deviations from a reference trajectory resulting from uncertainties affecting trajectory prediction. These deviations may result from uncertainties affecting trajectory prediction and may include flight technical errors and/or navigation systems errors. The uncertainties may comprise one or more of: inaccuracy in aircraft mass specified, inaccuracy of wind and/or temperature prediction, and inaccuracy of travel distance or travel time to runway of the aircraft.

The specification may comprise maximum values for the temporal and vertical deviations from a point along the reference trajectory. The maximum deviation along the reference trajectory may be based on deviations predicted to occur at one or more metering points along the trajectory, or calculated over the entire descent profile. The precise method may depend on specific airport operational requirements. For example, the ANSP may only enforce RNP restrictions at specific traffic merging points and may not be concerned with deviations along the path towards those merging points.

The reference trajectory may comprise a descent into arrivals.

The present disclosure also provides a method of determining compliance of a flight management system guidance method of an aircraft to a required navigation performance specification. The method may be performed in-flight on approach or in anticipation of arrival at the specified airport. The method may also be performed during design of an aircraft, and flight management guidance system in particular, to evaluate the confinement achievable for a set of scenarios. In such a design phase, the comparison could be to a benchmark instead of operational requirements of an airport, or a specification for a particular airport could be used. The method comprises: calculating actual temporal and vertical deviation from a reference trajectory of the flight management system guidance method for the aircraft; comparing the actual temporal and vertical deviation with a temporal and vertical required navigation performance specification; and providing an indication if the flight management guidance method of the aircraft complies with the required navigation performance based on the comparison.

The method may further comprise one of more of: adjusting the flight management guidance method to comply with the required navigation performance by relaxing temporal or vertical navigation performance settings of the flight management guidance method; and changing to an alternative flight management guidance method and recalculating the vertical and temporal navigation performance. At least one of the steps of adjusting and changing may occur in-flight. Such adjusting and changing steps might occur in-flight if the guidance method allows simple tuning, for example, based on setting the T-RNP and V-RNP requirements. The adjusting and changing could also be performed before departure if the arrivals airport has a substantially static specification.

The method may further comprise flying the aircraft according to a compliant flight management guidance method.

The present disclosure further comprises computer apparatus arranged to perform any of the methods set out above.

The present disclosure also provides an aircraft comprising a computer apparatus arranged to perform any of the methods set out above.

The present disclosure provides a computer program comprising instructions that when executed on a computer, cause the computer to perform any of the methods set out above.

The present disclosure further provides a computer readable storage device having stored therein a computer program as set out above.

BRIEF DESCRIPTION OF THE DRAWINGS

Examples disclosed herein will now be described with reference to the accompanying drawings, of which.

DESCRIPTION

An example method to aid the specification of temporal and vertical required navigation performance (T-RNP and V-RNP) for aircraft from an air traffic management point of view is disclosed herein. In some examples, the method is applied to aircraft arrivals, for example, for descent to an airport.

In descent the vertical navigation system of the on-board flight management system guides the aircraft along a predicted reference descent profile. Uncertainties and inaccuracies cause altitude and time deviations from the reference profile. The flight management system fights these uncertainties distributing deviations between altitude and time deviations to produce the vertical and temporal actual navigation performance, respectively V-ANP and T-ANP.

An important source of uncertainty commonly agreed within the ATM community is wind. The magnitude of this source of uncertainty naturally depends on the quality of the wind forecast. The forecast quality can be assumed the same for all systems, but the magnitude of the uncertainty that results may depend on the way the flight management system makes use of this data. Hence benchmark scenarios and airport specific studies may be used. Other sources of uncertainty are described herein and taken account of in the methods.

Figure 1:
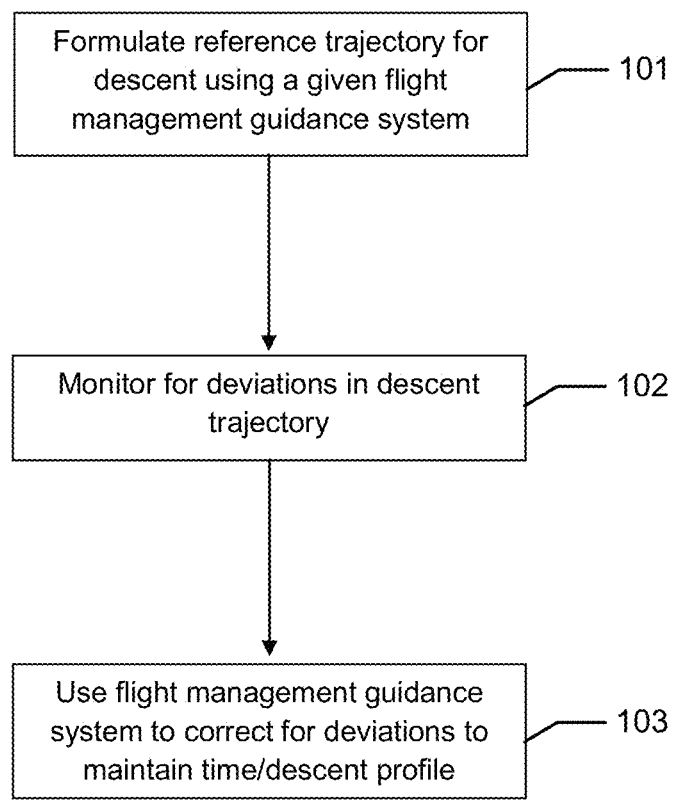
FIG. 1 is a flow chart showing method steps of a flight management guidance system during flight.
Figure 2:
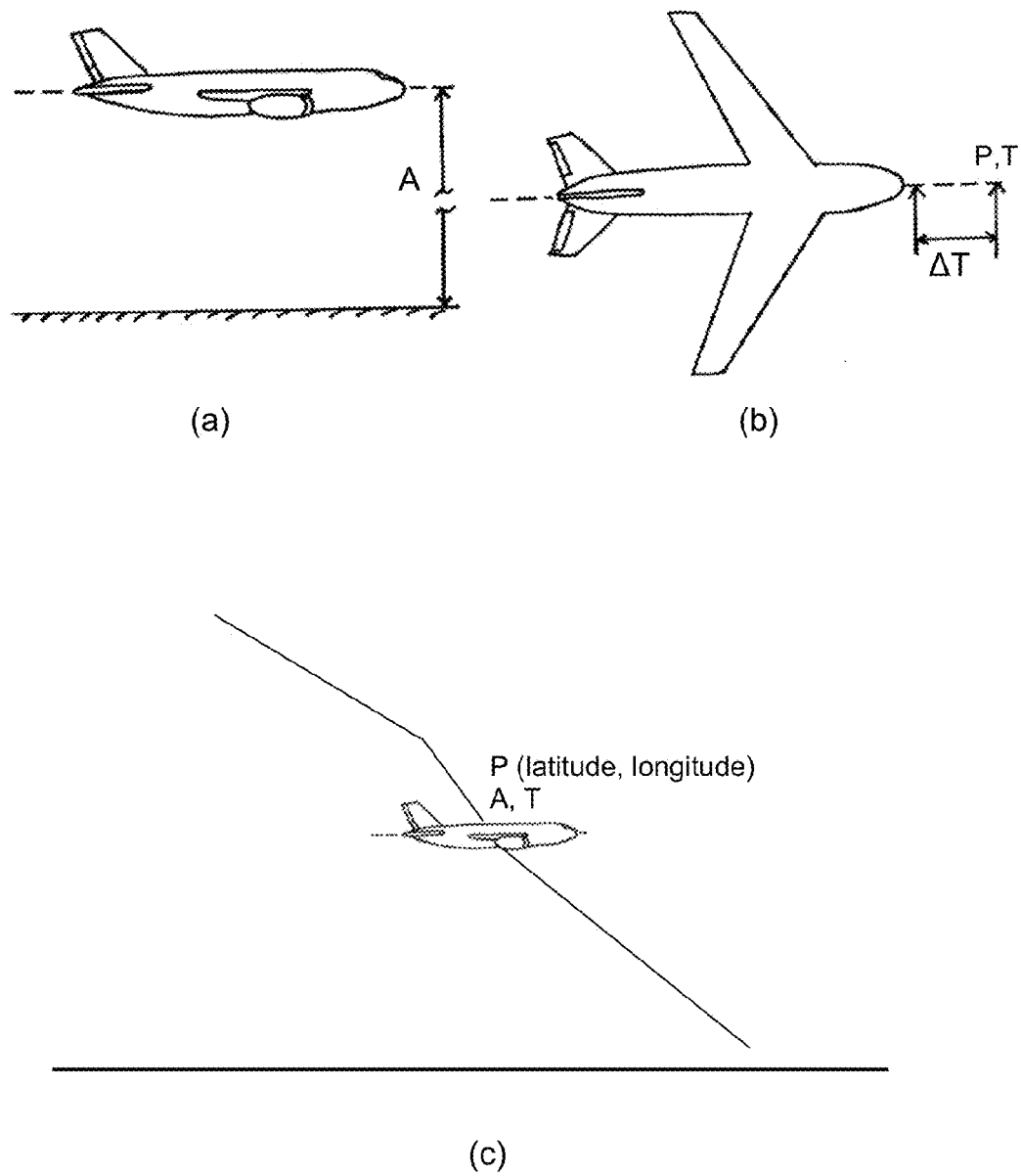
FIGS. 2a-2c illustrate an aircraft following a reference trajectory and in which the aircraft deviates from the reference trajectory.

FIGS. 2a-2c show an aircraft travelling a reference trajectory. As shown in FIG. 2a, the reference trajectory may have an altitude A over location P as shown in FIG. 2b. According to a reference trajectory the aircraft is planned to pass over location P at time T. However, as shown in FIG. 2b, uncertainties and inaccuracies may deviate the arrival of the aircraft such that it is delayed by time $\Delta T$. Alternatively, the aircraft arriving over location P may deviate by an altitude $\Delta A$ but arrive over the location in line with the reference time T. FIG. 2c shows the reference trajectory for descent into arrivals with the aircraft arriving at planned altitude A and time T at the location P. The location P may be a waypoint or other location such as specified by latitude and longitude.

As set out above, the distribution of the deviation between time and altitude will depend on the flight management system used. For example, a flight management system of the VNAV-PATH type may push deviations into the temporal domain to maintain the required altitude performance. Alternatively, other flight management systems may push deviations into the vertical domain to maintain the required temporal performance. Further flight management systems are available that use various principles to obtain intermediate positions in which the deviations are some combination, to various degrees, of altitude and temporal deviations.

Figure 3:
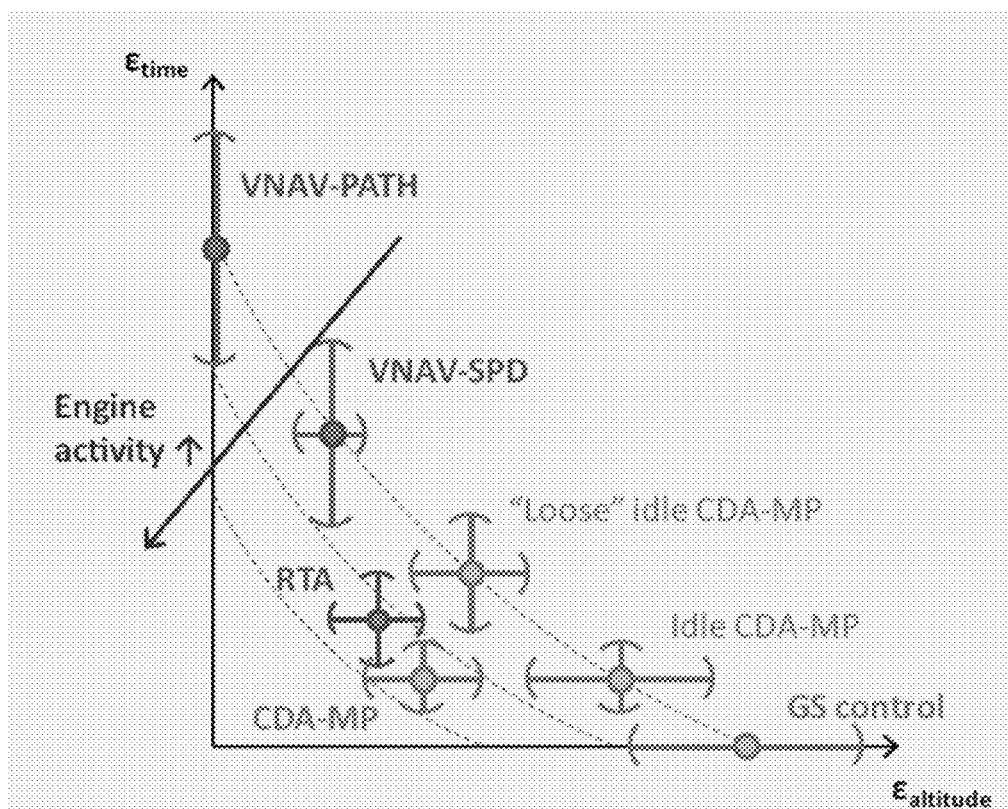
FIG. 3 is a diagram mapping temporal and vertical deviation statistics of a series of flight management system guidance methods.

FIG. 3 is a map of quantifying the relative deviations in time and altitude of a number of flight management system guidance methods, for example for arrivals at a given airport.

Figure 5:
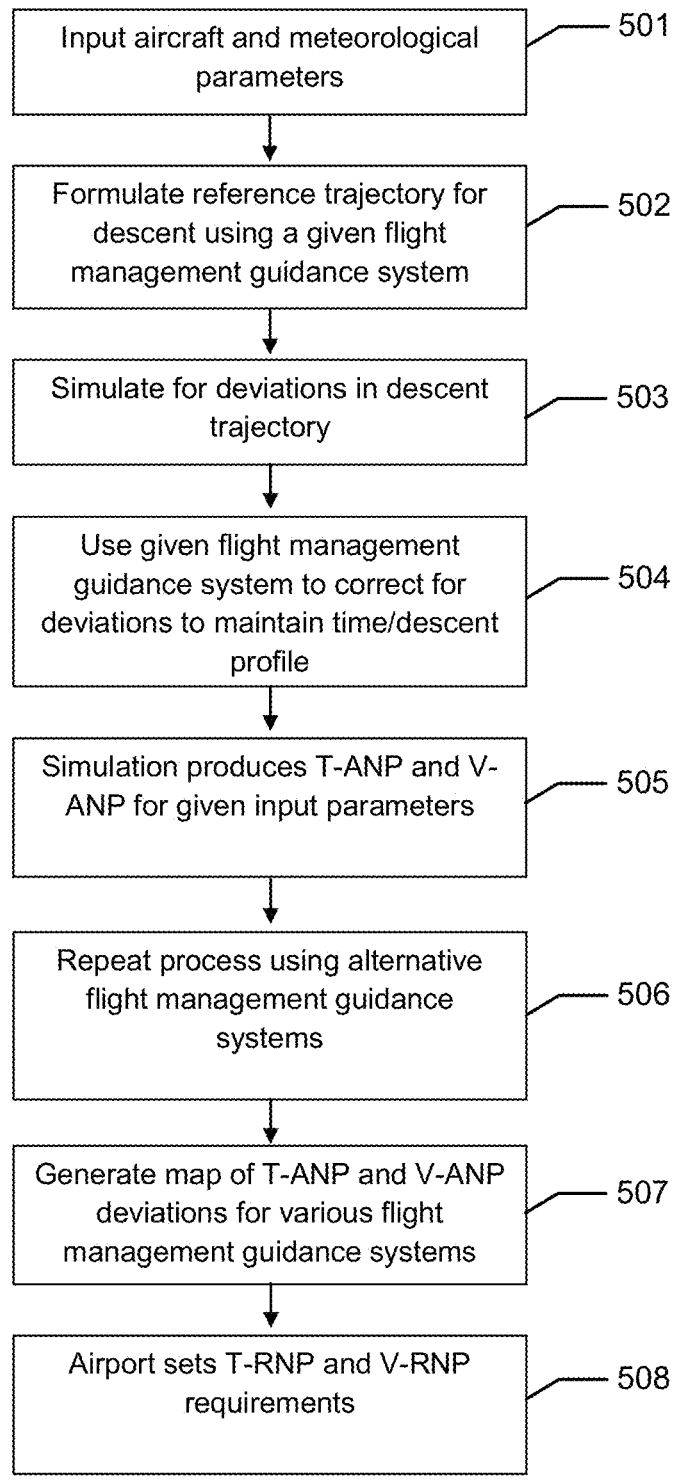
FIG. 5 is a flow chart showing method steps in determining a map of T-RNP and V-RNP navigation performance and the resulting airport specification.

FIG. 3 is obtained by performing the method according to FIG. 5. Before considering the implications of the map of FIG. 3 it is first appropriate to describe the method.

FIG. 5 shows eight steps 501 to 508. The method is implemented using a tool suitable for modelling the performance of various flight management system guidance methods. One suitable tool is the Boeing tool known as Future ATM Concept Test bench (FACT), which is a fast-time traffic simulator with strength in modelling existing and innovative flight management system guidance methods.

The first steps of the method are to formulate a reference trajectory 502 based on input parameters which may relate to the aircraft type, loading, meteorological conditions, flight management system guidance method, and airport. At step 503 deviations in the reference trajectory are determined based on the guidance method being used by taking into account uncertainties affecting trajectory such as wind, temperature, and any uncertainties in aircraft loading. The deviations are calculated using Monte Carlo simulations to assess random variations in the main uncertainties. For most guidance methods the size of the deviations depends on the travelled distance or time which may be specific to the arrival scenario and air traffic management concept used. At step 504 the model is run such that the flight management system corrects for deviations to maintain as closely as possible the time/descent profile according to the flight management system guidance method criteria. The simulation for the given flight management system guidance method results in the temporal and vertical actual navigation performance, known as T-ANP and V-ANP respectively. Maximum deviations in time and altitude determined are included in a map of deviation, such as shown in FIG. 3.

To provide a comparison of other flight management system guidance methods the simulation is repeated at step 506 using alternative flight management guidance system methods to produce values for T-ANP and V-ANP for the other guidance methods. As indicated at step 507 the deviations from the reference trajectory are mapped as shown in FIG. 3. The map can relate to deviations in aircraft arrivals at an airport or deviations at a specific waypoint. The map of FIG. 3 has along the abscissa the deviation in altitude $\epsilon_{altitude}$, and has along the ordinate the deviation in time $\epsilon_{time}$. The curved dashed lines between the two axes are lines representing equivalence between time and altitude deviation.

The mapped points indicate the mean of the maximum deviations in time and altitude which are plotted as $\epsilon_{time}$ and $\epsilon_{altitude}$. The intervals represent a 95% confinement interval for the maximum deviation. Other measures of deviation may be used to illustrate the points and intervals.

The map of FIG. 3 includes seven flight management system guidance methods, namely VNAV-PATH, VNAV-SPD, RTA, CDA-MP, GS control and variations to the CDA-MP method. VNAV-PATH, VNAV-SPD and RTA are existing guidance methods and have been described above in reference to the prior art. The remaining guidance methods are innovative methods aimed at improving time accuracy. GS Control refers to ground speed control. CDA-MP represents continuous descent arrival for maximum predictability. CDA-MP is based on adjusting the angle of descent to maintain a ground speed reference within a given accuracy. The aircraft's engines are substantially set to idle but spoilers and/or throttle can be adjusted to keep the vertical deviation within bounds. This approach aims to provide maximum predictability in time of arrival at any point in the descent.

As set out above, the details of the guidance method determine how the deviations are distributed between vertical position and temporal (along track) position. Extremes are the VNAV-PATH and GS Control methods which respectively accurately follow the vertical reference trajectory profile and the time/position along track profile. However, by pushing all deviations into either time or position, the other of time and position has a large deviation. In order to reduce deviations such that the resulting method is closer to the origin of the map of FIG. 3, more energy corrections need to be applied. The RTA (Required Time of Arrival) method of Boeing 737s attempts to minimize target time deviations by recalculating the descent profile with a new descent speed if deemed necessary. The recalculated descent profile requires throttle and/or spoiler usage in adjusting the speed and returning to an idle engine descent profile.

The CDA-MP method also requires engine corrections applied by use of the throttle and/or spoiler, but they are applied in a different way to the RTA method resulting in different actual navigation performances and deviations.

In general energy corrections are made at the expense of fuel consumption as indicated by the arrow in FIG. 3 which illustrates that the closer to the origin the more engine activity and fuel will be used.

As mentioned above, variations to the CDA-MP guidance method are also shown in FIG. 3. Idle CDA-MP does not apply energy corrections and all additional deviations are pushed into altitude deviations. "Loose" idle CDA-MP relaxes the control on angle of descent thereby decreasing the temporal predictability but reducing the vertical deviation.

As shown in FIG. 3 the RTA and CDA-MP methods are closest to the origin in terms of minimum deviations. The other five methods, namely VNAV-PATH, VNAV-SPD, "Loose" idle CDA-MP, Idle CDA-MP and GS control, lie on one of the dashed curved lines showing a correspondence between temporal and vertical deviation.

Figure 4:
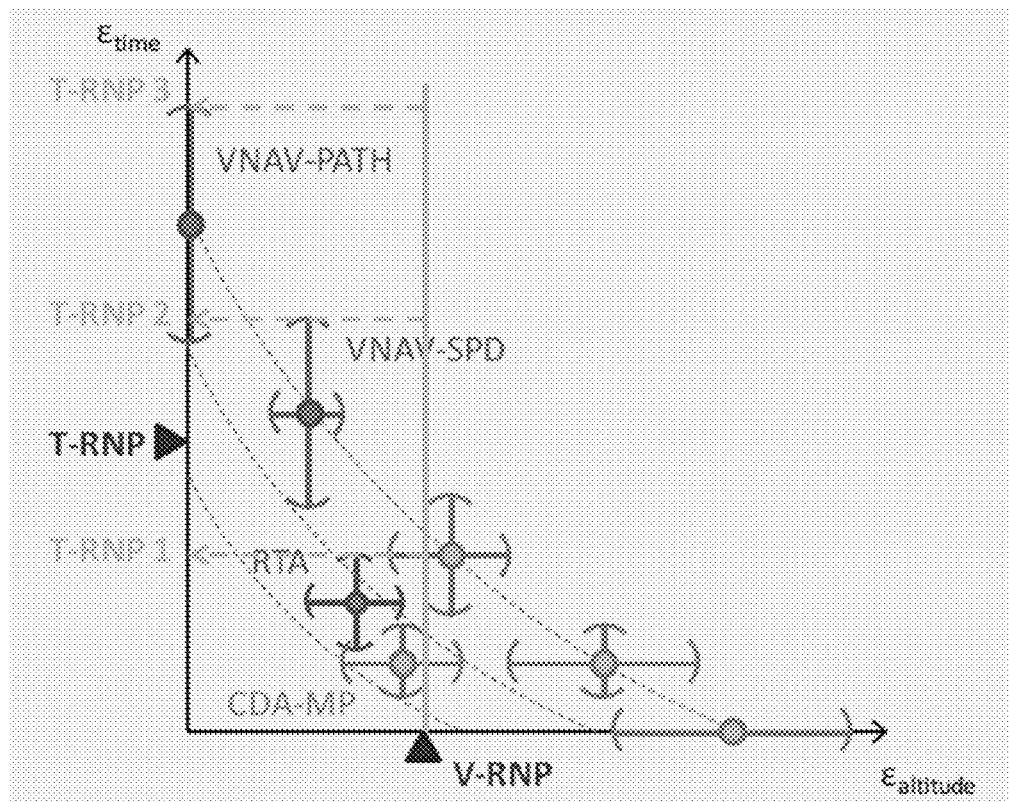
FIG. 4 is the diagram of FIG. 3 with example limits in T-RNP and V-RNP.

FIG. 4 is based on FIG. 3 but uses the map of FIG. 3 to evaluate candidate specifications for the temporal and vertical required navigation performance, T-RNP and V-RNP. Airport operations are taken into account in the evaluation.

For an aircraft to meet the desired RNP, the aircraft should meet the performance in 95% of arrivals. FIG. 4 shows an RNP based solely on vertical required navigation performance indicated by the line V-RNP. Such a specification might be applied to a low arrival density metro airport where vertical position is more important than timing. In this case, the specification rules out all CDA-MP guidance methods along with the GS Control method. Only VNAV and RTA guidance methods meet the specification. In setting a temporal specification, it should not be set lower than T-RNP3 in order to accept aircraft with all other remaining guidance methods.

If it is desired that the specification should also set a relatively stringent temporal limit, such as indicated by the line T-RNP in FIG. 4, then only aircraft utilising the RTA guidance method would meet the specification. For more aircraft to meet the specification, the flight management system manufacturer could tune the CDA-MP guidance method which according to the figure is close to meeting the T-RNP and V-RNP specification. This could be achieved by moving the CDA-MP performance to the left in FIG. 4 by allowing more energy corrections at the expense of slightly higher fuel consumption.

The lines T-RNP1 and T-RNP2 provide other examples of RNP specifications.

The map identifies trade-offs between T-RNP and V-RNP and can be used to aid setting reasonable requirements according to the needs of the ATM system or local airport requirements. The map provides information on the viability of T-RNP and V-RNP combinations and the type or aircraft and mix of aircraft that would meet the specification. Once T-RNP and V-RNP have been specified, appropriate separations between incoming aircraft can be determined. The separations can then be used in the scheduler of an airport arrivals manager.

In addition, the V-RNP information can be taken into account for designing arrivals procedures with altitude windows having fuel efficient descent profiles.

For airlines the benefit may be from a more efficient and effective scheduling by the air traffic control (ATC) of incoming flights to an airport, such that fewer flights are delayed on approach. Furthermore, less tactical interventions by air traffic control and fewer delays will result in fuel savings for the airlines.

The map and methods may also be performed during design of an aircraft, and flight management guidance system in particular, to evaluate the confinement achievable for a set of scenarios. In such a design phase, the comparison could be to a benchmark instead of operational requirements of an airport, or a specification for a particular airport could be used. In some examples, an airport specific comparison may be required for some airports as the magnitude of uncertainties in atmospheric conditions can be very specific due to the typical weather conditions and airport elevation. Additionally the specific structure of arrival procedures of an airport may also have an effect on the confinement results.

It is noted that this patent claims priority from European Patent Application No. 12382474.0, filed on Nov. 29, 2012, entitled "Navigation Performance Specification," and incorporated by reference herein in its entirety.

It will be appreciated by those skilled in the art that many variations and modifications are possible within the scope of the claims. For example, other flight management guidance systems and simulation tools may be used.

What is claimed is:

1. A method of formulating a specification for temporal and vertical required navigation performance, comprising:
    calculating, via a computer, temporal and vertical deviations from a reference trajectory for one or more flight management guidance methods for one or more aircraft types based on a plurality of simulations taking into account uncertainties affecting trajectory; and
    generating, via the computer, the specification for temporal and vertical required navigation performance based on the temporal and vertical deviations.

2. The method of claim 1, further comprising comparing the temporal and vertical deviations with operational requirements of an airport to generate the specification.

3. The method of claim 1, further comprising comparing the temporal and vertical deviations with a reference scenario to generate the specification.

4. The method of claim 1, wherein generating the specification comprises:

generating a map of the temporal and vertical deviations from the reference trajectory for each of the one or more flight management guidance methods for the one or more aircraft types; and assessing the map for each of the one or more flight management guidance methods for the one or more aircraft types in comparison to operational requirements or a reference scenario to generate the specification.

5. The method of claim 4, wherein points on the map represent maximum deviations in time and altitude.

6. The method of claim 5, wherein intervals around the points represent a confinement interval for the maximum deviation.

7. The method of claim 1, wherein calculating temporal and vertical deviations from the reference trajectory comprises calculating temporal and vertical actual navigation performance for the one or more flight management guidance methods of the one or more aircraft types.

8. A method of formulating a specification for temporal and vertical required navigation performance, comprising:

calculating, via a computer, temporal and vertical deviations from a reference trajectory for one or more flight management guidance methods for one or more aircraft types; and generating, via the computer, the specification for temporal and vertical required navigation performance based on the temporal and vertical deviations, wherein calculating the temporal and vertical deviations from the reference trajectory comprises calculating temporal and vertical actual navigation performance for the one or more flight management guidance methods of the one or more aircraft types, and wherein calculating the temporal and vertical actual navigation performance includes calculating deviations from the reference trajectory resulting from uncertainties affecting trajectory prediction.

9. The method of claim 8, wherein the uncertainties affecting trajectory prediction include at least one of a flight technical error or a navigation systems error.

10. The method of claim 8, wherein the uncertainties comprise at least one of:

inaccuracy in aircraft mass specified, inaccuracy of wind prediction, inaccuracy of temperature prediction, inaccuracy in prediction of travel distance or travel time to runway of the aircraft, variations in manual pilot control actions, or inaccuracy in an aircraft performance model contained in a flight management system.

11. The method of claim 1, wherein the specification comprises a maximum value for the temporal and vertical deviations from a point along the reference trajectory.

12. The method of claim 1, wherein the reference trajectory comprises a descent into arrivals.

13. A method of determining compliance of a flight management guidance method of an aircraft to a required navigation performance specification, the method comprising:

calculating, via a computer, actual temporal and vertical deviation from a reference trajectory of the flight management guidance method for the aircraft;

comparing, via the computer, the actual temporal and vertical deviation with a temporal and vertical required navigation performance specification; and providing an indication if the flight management guidance method of the aircraft complies with the required navigation performance specification.

14. The method of claim 13, further comprising:

adjusting the flight management guidance method to comply with the required navigation performance specification by relaxing temporal or vertical navigation performance settings of the flight management guidance method; and changing to an alternative flight management guidance method and recalculating the actual vertical and temporal navigation deviation.

15. The method of claim 14, wherein adjusting the flight management guidance method comprises adjusting the flight management guidance method in-flight or before departure.

16. The method of claim 13 further comprising flying the aircraft according to a compliant flight management guidance method.

17. A non-transitory computer readable storage device comprising instructions that, when executed, cause a machine to at least:

calculate actual temporal and vertical deviation from a reference trajectory of a flight management guidance method for an aircraft;

compare the actual temporal and vertical deviation with a temporal and vertical required navigation performance specification; and provide an indication if the flight management guidance method of the aircraft complies with the required navigation performance specification.

18. The non-transitory computer readable storage device of claim 17, wherein the instructions, when executed, further cause the machine to:

adjust the flight management guidance method to comply with the required navigation performance specification by relaxing temporal or vertical navigation performance settings of the flight management guidance method; and change to an alternative flight management guidance method and recalculating the actual vertical and temporal navigation deviation.

19. The non-transitory computer readable storage device of claim 18, wherein the instructions, when executed, cause the machine to adjust the flight management guidance method by adjusting the flight management guidance method in-flight or before departure.

20. The non-transitory computer readable storage device of claim 17, wherein the instructions, when executed, further cause the machine to fly the aircraft according to a compliant flight management guidance method.

* * * * *